3,000,894
CHLORAL DERIVATIVES OF AMINO QUINOLINE
Russell M. Bimber, Painesville, Ohio, assignor to Diamond Alkali Company, Cleveland, Ohio, a corporation of Delaware
No Drawing. Filed Oct. 31, 1957, Ser. No. 693,541
2 Claims. (Cl. 260—288)

This invention relates to compounds of the structure:

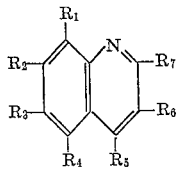

wherein $R_1$, $R_2$, $R_3$, $R_4$, $R_5$, $R_6$, and $R_7$ are selected from the group consisting of hydrogen atoms, alkyl radicals, such as methyl, ethyl, propyl, butyl, and the like, and at least one radical of the structure:

(I)

wherein Y is a halogen-substituted alkyl radical, such as trichloromethyl, 1,1,2-trichloropropyl, tribromomethyl, 1-chloropropyl, and 1-chloroethyl, in which compounds the R groups on the carbon atoms adjacent to group I are hydrogen atoms, and to the method of preparing and using such compounds. More specifically this invention deals with compounds of the structure:

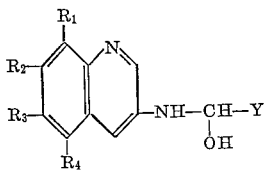

wherein $R_1$, $R_2$, $R_3$, and $R_4$ are selected from the group consisting of alkyl radicals, preferably lower alkyl radicals, and hydrogen atoms; and Y is an alpha-halo-alkyl radical as hereinbefore described.

Still more specifically, this invention is directed to compounds of the structure:

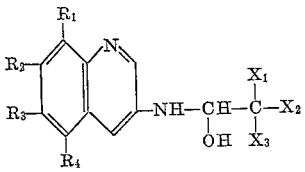

wherein $R_1$, $R_2$, $R_3$, and $R_4$ are selected from the group consisting of hydrogen atoms and alkyl radicals, such as methyl, ethyl, propyl, and butyl; and $X_1$, $X_2$, and $X_3$ are selected from the group consisting of hydrogen atoms, and halogen atoms, i.e., fluorine, chlorine, bromine and iodine, chlorine being preferred, at least one X being halogen.

Specific illustrative compounds of this invention are: 3-(2,2,2-trichloro-1-hydroxyethyl) amino-8-methylquinoline; 3-(2,2,2-trichloro-1-hydroxyethyl) amino-5,6,7-triethylquinoline; 3-(2,2,2-trichloro-1-hydroxybutyl) amino-7-butylquinoline; 3-(2,2,2-trichloro-1-hydroxybutyl) amino-5-propylquinoline; 6-(2,2,2-trichloro-1-hydroxyethyl) amino - 2,3 - dimethylquinoline; 7-(2,2,2-tribromo-1-hydroxyethyl) aminoquinoline; 2-(2,3-dichloro-1-hydroxybutyl) aminoquinoline; 3-(2,2,2-trichloro-1-hydroxyethyl) aminoquinoline; 2-(2,2,2-trichloro-1-hydroxyethyl) aminoquinoline; 4-(2,2,2-trichloro-1-hydroxyethyl) aminoquinoline; 2-(2,2,3-trichloro-1-hydroxybutyl) aminoquinoline; 3-(2,2,3-trichloro-1-hydroxybutyl) aminoquinoline; and 4-(2,2,3-trichloro-1-hydroxybutyl) aminoquinoline.

Compounds of this invention can be prepared by chemically reacting a compound of the structure:

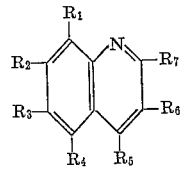

wherein $R_1$, $R_2$, $R_3$, $R_4$, $R_5$, $R_6$, and $R_7$ are selected from the group consisting of amino radicals, hydrogen atoms and alkyl radicals, wherein at least one R group is an amino radical, the R groups on carbon atoms adjacent to the amino-substituted carbon atoms being hydrogen atoms, with an alpha halo aldehyde.

More specifically, the process of this invention is carried out by chemically reacting a compound of the structure:

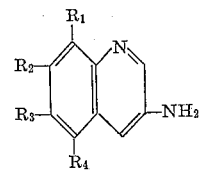

wherein $R_1$, $R_2$, $R_3$, and $R_4$ are selected from the group consisting of hydrogen atoms and alkyl radicals, with an alpha halo aldehyde, such as a halogen-substituted acetaldehyde, preferably chloral. Generally, the reaction may be more easily effected by bringing the two reactants together in the presence of an organic solvent, such as benzene, chloroform, heptane, or cyclohexane.

Specifically representative of the above type of reaction is the preparation of 3-(2,2,2-trichloro-1-hydroxyethyl) aminoquinoline, wherein equimolar amounts of 3-aminoquinoline and chloral are chemically reacted yielding a white crystalline product melting at 151°–152° C. The reaction temperature is preferably kept below the reflux temperature of the chloral. The reaction product may be purified, preferably through crystallization from an organic solvent, such as chloroform, petroleum ether, or carbon tetrachloride.

The compounds of this invention are useful in fields of pharmaceuticals, chemical intermediates, and also show biological activity, such as the control of microorganism growth, e.g., protection of tomato foliage against blight fungi, and the prevention of weed seed development. While compounds of this invention may be employed in a variety of applications it will be understood of course that these compounds may be utilized in diverse formulations both liquid and solid, including finely divided powders, and granular materials as well as liquids such as salt solutions, concentrates, emulsifiable concentrates, slurries and the like, depending upon the application intended and the formulation media desired.

Thus, it will be appreciated that compounds of this invention may be employed to form biologically active substances containing such compounds as essential active ingredients, which compositions may also include finely divided dry or liquid diluents, extenders, fillers, conditioners, including various clays, diatamaceous earth, talc, spent catalyst, alumina silica materials and incorporating liquids, solvents, etc., typically water and various organic liquids such as kerosene, benzene, toluene, and other petroleum distillate fractions or mixtures thereof.

When liquid formulations are employed, or dry materials prepared which are to be used in liquid form, it is desirable in certain instances additionally to employ a wetting, emulsifying, or dispersing agent to facilitate use of the formulation, e.g., Triton X-155 (alkyl aryl polyether alcohol, U.S. Patent 2,504,064).

The term "carrier" as employed in the specification and claims is intended to refer broadly to the material constituting a major proportion of a biologically active or other formulation and hence includes finely divided materials both liquids and solids as aforementioned conventionally used in such applications.

In order that those skilled in the art may more completely understand the invention and the preferred methods by which the same may be carried into effect, the following specific examples are offered:

EXAMPLE I

Part A

Preparation of 3 - (2,2,2 - trichloro-1-hydroxyethyl) aminoquinoline: 36 g. (0.25 mol) of 3-aminoquinoline is dissolved in 600 ml. of warm toluene and 26.0 ml. of chloral is added portionwise with stirring. The reaction is exothermic and therefore the reaction mixture is cooled, keeping the temperature between 50° C. and 72° C. Yellow to white crystals separate from the reaction materials as the last 5 ml. of chloral is added. Upon reaction completion, the mixture is allowed to cool to room temperature after which the product is filtered off and dried. The 77.5 g. crude product is recrystallized from chloroform. This step yields a white product having a melting point of 151°–152° C. Preparation of the desired $C_{11}H_{11}Cl_3N_2O$ is indicated through the following elemental analysis:

| Element | Actual, percent by wgt. | Calculated, percent by wgt. |
| --- | --- | --- |
| C | 45.4 | 45.2 |
| H | 3.3 | 3.7 |
| Cl | 37.0 | 36.4 |

The above product is soluble in acetone and insoluble in water and xylene.

EXAMPLE I

Part B

In order to demonstrate insecticidal activity of the product of Part A, adult two-spotted spider mites, *Tetranychus bimaculatus*, maintained on Tendergreen beans under controlled conditions are transferred from a stock culture by leaf cuttings to uninfested seed leaves of bean plants in 2½ inch pots the day prior to testing. A formulation of the product of Part A (2000 p.p.m. test chemical, 5% acetone, 0.01% Triton X-155, balance water) is sprayed on the infested test plants. Counts are made after two days showing 46% insect mortality.

EXAMPLE I

Part C

Fungicidal utility is demonstrated through spore germination tests on glass slides conducted by the test tube dilution method adopted from the procedure recommended by the American Phytopathological Society's Committee on Standardization of Fungicidal Tests. In this procedure, the product of Part A in aqueous formulation at concentrations of 1000, 100, 10 and 1.0 p.p.m. is tested for its ability to inhibit germination of spores from 7–10 day old cultures of *Alternaria oleracea* and *Monilinia fructicola*. These concentrations refer to initial concentrations before diluting 4 volumes with 1 volume of spore stimulant and spore suspension. Germination records are taken after 20 hours of incubation at 22° C. by counting 100 spores. Results indicate that concentrations of 100 to 1000 p.p.m. afford disease control for both the *A. oleracea* and *M. fructicola*.

EXAMPLE I

Part D

Fungicidal utility is further demonstrated by the ability of the product of Part A to protect tomato plants against the Late Blight fungus *Phytophthora infestans*. The method employs tomato plants 5 to 7 inches high of the variety Bonny Best. 100 ml. of the test formulations at 2000 p.p.m. and 400 p.p.m. test chemical in combination with 5% acetone, 0.01% Triton X-155, and the balance water are sprayed on the plants at 40 pounds air pressure while the plants are being rotated on a turntable in a spray chamber. After the spray deposit is dry, the treated plants and comparable untreated controls are sprayed with a spore suspension containing approximately 150,000 sporangia of *P. infestans* per ml. The plants are held in a saturated atmosphere for 24 hours at 60° F. to permit spore germination and infection. After 2–4 days, lesion counts are made on the three uppermost fully expanded leaves. Comparing the number of lesions on the test plants and control plants shows disease control of 100% and 99% at the 2000 p.p.m. and 400 p.p.m. concentrations, respectively, demonstrating a high degree of fungicidal activity.

EXAMPLE I

Part E

Seeds of perennial rye grass and radish are treated in Petri dishes with aqueous solutions of the product of Part A at 1000 and 100 p.p.m. (1000 and 100 p.p.m. test chemical, 5% acetone, 0.01% Triton X-155, balance water). Lots of 25 seeds of each type are scattered in separate plates containing filter paper discs moistened with 5 ml. of the test formulation at each concentration. After 7 to 10 days under controlled conditions, the test compound is evaluated according to the concentration that inhibits germination of half of the seeds in the test crop. Data indicates that concentrations of 100 to 1000 p.p.m. afford significant inhibition of seed germination.

EXAMPLE I

Part F

Further evaluation of herbicidal activity is carried out using tomato plants, variety Bonny Best, 5 to 7 inches tall, and corn plants, variety Cornell M-1 (field corn), 4 to 6 inches tall, by pouring 51 ml. of a 2000 p.p.m. aqueous test formulation (2000 p.p.m. test chemical, 5% acetone, 0.01% Triton X-155, balance water) onto the soil of 4 inch pots (102 mg. per pot or approximate equivalent to 128 pounds per acre) in which the plants are growing. Plants are held under controlled greenhouse conditions for at least 10 days before examination after which phytotoxicity ratings are given based on a scale from 0 for no injury to 11 for plant kill. Using this procedure, the tomato plants receive a rating of 6 and the bean plants 0.

It is to be understood that although the invention has been described with specific reference to particular embodiments thereof it is not to be so limited since changes and alterations therein may be made which are within the full intended scope of this invention as defined by the appended claims.

What is claimed is:

1. A compound of the structure:

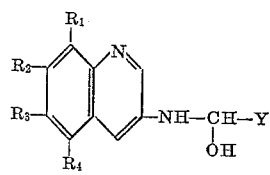

wherein $R_1$, $R_2$, $R_3$ and $R_4$ are selected from the group consisting of lower alkyl and hydrogen atoms, and Y is an alpha halo lower alkyl wherein the halogen is selected from the group consisting of chlorine and bromine.

2. 3-(2,2,2-trichloro-1-hydroxyethyl) aminoquinoline.

References Cited in the file of this patent

UNITED STATES PATENTS

| | | |
|---|---|---|
| 2,349,344 | Gerther | May 23, 1944 |
| 2,354,940 | Carter | Aug. 1, 1944 |
| 2,661,276 | Schlesinger et al. | Dec. 1, 1953 |
| 2,692,822 | Denny | Oct. 26, 1954 |
| 2,775,595 | Goldberg | Dec. 25, 1956 |
| 2,849,452 | Webb | Aug. 26, 1958 |
| 2,861,919 | Gilbert | Nov. 25, 1958 |

OTHER REFERENCES

Wheeler: Journ. Amer. Chem. Soc., vol. 31 (1909), page 941.

Jordan: Jour. Amer. Chem. Soc., vol. 32 (1910), pages 973–4.

Frear: Jour. Economic Entomology, vol. 40, No. 5 (1947), pages 736–41.

Horsfall: Contr. Boyce Thompson Inst., vol. 16 (1951), pages 313, 345–6.

Horsfall: Principles of Fungicidal Activity (1956), page 201.